United States Patent
Ahmadloo et al.

(10) Patent No.: US 11,374,321 B2
(45) Date of Patent: Jun. 28, 2022

(54) INTEGRATED DIFFERENTIAL ANTENNA WITH AIR GAP FOR PROPAGATION OF DIFFERENTIAL-MODE RADIATION

(71) Applicant: Veoneer US, Inc., Southfield, MI (US)

(72) Inventors: Majid Ahmadloo, Lowell, MA (US); Arnold Mobius, North Chelmsford, MA (US)

(73) Assignee: VEONEER US, INC., Southfield, MI (US)

( * ) Notice: Subject to any disclaimer, the term of this patent is extended or adjusted under 35 U.S.C. 154(b) by 477 days.

(21) Appl. No.: 16/579,956

(22) Filed: Sep. 24, 2019

(65) Prior Publication Data

US 2021/0091470 A1     Mar. 25, 2021

(51) Int. Cl.
    *H01Q 9/04*           (2006.01)
    *G01S 7/03*            (2006.01)
    *G01S 13/931*       (2020.01)

(52) U.S. Cl.
    CPC ........... *H01Q 9/0407* (2013.01); *G01S 7/032* (2013.01); *G01S 13/931* (2013.01)

(58) Field of Classification Search
    CPC .. H01Q 9/0407; H01Q 13/206; H01Q 1/3233; H01Q 1/38; H01Q 21/08;
(Continued)

(56) References Cited

U.S. PATENT DOCUMENTS 4,301,457 A    11/1981   Bogner
4,431,996 A    2/1984    Milligan
(Continued)

FOREIGN PATENT DOCUMENTS

EP         1764863 A1     3/2007
WO    2017167987 A1   10/2017
(Continued)

OTHER PUBLICATIONS

G. -F. Cheng and C. -K. C. Tzuang, "A Differentially Excited Coupled Half-Width Microstrip Leaky EH1 Mode Antenna," in IEEE Transactions on Antennas and Propagation, vol. 61, No. 12, pp. 5885-5892, Dec. 2013, doi: 10.1109/TAP.2013.2280473. (Year: 2013).*

(Continued)

*Primary Examiner* — Vladimir Magloire
*Assistant Examiner* — Yonghong Li
(74) *Attorney, Agent, or Firm* — Burns & Levinson LLP; Steven M. Mills

(57) ABSTRACT

A differential antenna includes a substrate formed of non-radio-frequency material and a pair of conductive microstrip lines formed on the substrate. A metallic sheet is supported and spaced apart from the pair of conductive microstrip lines by a plurality of support elements to form an air gap. The metallic sheet is patterned to include a plurality of differential radiating gaps disposed along the longitudinal axis of the antenna and above a gap between the pair of conductive microstrip lines. Multiple rows of metallic vias are formed in the substrate disposed and spaced apart laterally with respect to the gap between the pair of conductive microstrip lines to define two propagation air cavities in which radiation can propagate. The differential antenna is configured such that the radiation is differential-mode, second-order radiation, which is emitted from the differential antenna at the differential radiating gaps in the metallic sheet.

21 Claims, 7 Drawing Sheets

(58) Field of Classification Search
CPC ......... H01Q 3/01; G01S 7/032; G01S 13/931; G01S 7/03
See application file for complete search history.

(56) References Cited

U.S. PATENT DOCUMENTS

| | | | |
|---|---|---|---|
| 5,043,738 A | 8/1991 | Shapiro | |
| 5,907,305 A | 5/1999 | Epp et al. | |
| 6,476,696 B1 | 11/2002 | Mack | |
| 6,492,949 B1 | 12/2002 | Breglia et al. | |
| 6,496,147 B1 | 12/2002 | Kirino | |
| 6,556,168 B1 | 4/2003 | Marumoto et al. | |
| 7,450,071 B1 | 11/2008 | Volman | |
| 9,450,310 B2* | 9/2016 | Bily ................ | H01Q 3/00 |
| 10,897,088 B2* | 1/2021 | Mobius ............ | H01Q 1/3283 |
| 2003/0067410 A1 | 4/2003 | Puzella | |
| 2004/0150561 A1 | 8/2004 | Tillery et al. | |
| 2007/0026567 A1 | 2/2007 | Beer et al. | |
| 2008/0105966 A1 | 5/2008 | Beer | |
| 2010/0148892 A1 | 6/2010 | Tsutsumi et al. | |
| 2010/0182105 A1 | 7/2010 | Hein | |
| 2012/0256796 A1 | 10/2012 | Leiba | |
| 2015/0117862 A1 | 4/2015 | Trotta et al. | |
| 2016/0126636 A1 | 5/2016 | Uemichi | |
| 2016/0126637 A1 | 5/2016 | Uemichi | |
| 2016/0226148 A1 | 8/2016 | Ashida et al. | |
| 2017/0187124 A1 | 6/2017 | Kirino et al. | |
| 2017/0194716 A1 | 7/2017 | Kirino et al. | |
| 2017/0237176 A1* | 8/2017 | Xue ................ | H01Q 19/10 343/776 |
| 2018/0026378 A1 | 1/2018 | Hadavy et al. | |
| 2018/0351261 A1 | 12/2018 | Kamo et al. | |
| 2020/0076037 A1 | 3/2020 | Kishk | |
| 2020/0076086 A1 | 3/2020 | Cheng et al. | |
| 2020/0106152 A1 | 4/2020 | Fruehling et al. | |
| 2020/0127386 A1 | 4/2020 | Yekan et al. | |
| 2020/0153108 A1 | 5/2020 | Uemichi | |
| 2020/0168974 A1 | 5/2020 | Vosoogh | |
| 2020/0343648 A1 | 10/2020 | Tehran et al. | |

FOREIGN PATENT DOCUMENTS

| | | |
|---|---|---|
| WO | 2017182077 A1 | 10/2017 |
| WO | 2018236286 A1 | 12/2018 |

OTHER PUBLICATIONS

International Search Report and Written Opinion for International Application No. PCT/US2019/065660 dated Mar. 6, 2020.

* cited by examiner

INTEGRATED DIFFERENTIAL ANTENNA WITH AIR GAP FOR PROPAGATION OF DIFFERENTIAL-MODE RADIATION

BACKGROUND

1. Technical Field

The present disclosure is related to radar detection systems and, in particular, to a metal plate differential antenna and feed system for a radar detection system, the system using relatively inexpensive substrate materials instead of costly RF materials.

2. Discussion of Related Art

In conventional automotive radar sensor modules, electronic components are mounted on a printed circuit board (PCB). For example, both transmit (Tx) and receive (Rx) antenna components can be implemented by forming arrays of antenna "patches" on the surface of the PCB. These patches, as well as associated components such as feed lines, strip lines, waveguides and RF transition elements, e. g., waveguide-to-microstrip line transitions, are commonly formed by depositing metal and/or other conductive material on the surface of the PCB in a predetermined desired pattern.

Typically, PCBs are made of any standard inexpensive PCB material, such as, for example, FR4, which is a well-known National Electrical Manufacturers Association (NEMA) grade designation for glass-reinforced epoxy laminate material. This exemplary material and other such low-cost, non-RF materials will be referred to collectively herein as FR4. Typical automotive radar systems operate at high RF, for example, 24 GHz or 76-81 GHz. At such frequencies, the electronic characteristics of the conventional FR4 PCB material, e.g., dielectric constant and loss, can significantly change and degrade performance of the sensor, such as by antenna pattern degradation or by changing the coupling pattern of high-frequency Tx antenna signals to the Rx antenna patches or other circuitry in the sensor module. In general, the use of the FR4 material can result in overall degradation in performance of the RF antenna components and/or RF front end components, including feed lines, strip lines, waveguides and RF transition elements, e. g., waveguide-to-microstrip line transitions.

To mitigate the effects of these phenomena, the PCB in some conventional sensors has been made of or includes a special high-performance, high-frequency RF material which reduces these effects. This more specialized RF material, can be, for example, Astra® MT77 very low-loss high-frequency material, Rogers Corporation RO3003 or RO4350 ceramic-filled polytetrafluoroethylene (PTFE) composite high-frequency circuit material, or low-temperature co-fired ceramic (LTCC) material, or other similar material. A significant drawback to this approach is that these high-performance, high-frequency RF materials can be very expensive. Also, fabrication of the PCB can be complex and expensive since all of the electronic components in the sensor, including the high-frequency RF components (antennas, feed lines, strip lines, waveguides, RF transition elements, etc.), need to be formed in place on the PCB. Also, all of the associated support circuitry including digital components such as processors, memories, amplifiers, busses, as well as individual passive electronic components, e.g., resistors, capacitors, etc., must also be installed on the surface of the PCB. Also, fabrication processes can negatively affect performance of the RF circuitry and antennas due to the high sensitivity of such components to the material change resulting from exposure to solutions and processes used during fabrication of the PCB.

Furthermore, in the fabrication of RF structures such as waveguide antennas, the material of which the interior of the waveguide is made can introduce substantial RF loss, particularly at the high RF frequencies of interest. While it would be desirable to fabricate such structures from the relatively inexpensive FR4 material, given the loss involved and the resulting degradation in system performance, such an approach has many substantial drawbacks.

SUMMARY

According to one aspect, a differential antenna is provided. A substrate is formed of non-radio-frequency (RF) material. A pair of conductive microstrip lines is formed on a top surface of the substrate, the microstrip lines extending along a longitudinal axis of the differential antenna and being spaced apart to define a gap between the pair of conductive microstrip lines extending along the longitudinal axis of the antenna. A plurality of support elements is formed over the top surface of the substrate. A metallic sheet is formed over the pair of conductive microstrip lines and is supported by and vertically spaced apart from the pair of metallic strip lines by the plurality of support elements to form an air gap between the metallic sheet and the pair of conductive microstrip lines, the metallic sheet being patterned to include a plurality of differential radiating gaps disposed along the longitudinal axis of the antenna and above the gap between the pair of conductive microstrip lines. At least four rows of metallic vias are formed in the substrate, each row of metallic vias being disposed along a first via axis parallel to the longitudinal axis of the antenna, the four rows of metallic vias being disposed and spaced apart laterally with respect to the gap between the pair of conductive microstrip lines to define two propagation air cavities in which radiation can propagate between pairs of rows of vias and between the metallic sheet and the pair of conductive microstrip lines. The differential antenna is configured such that the radiation is differential-mode, second-order radiation, which is emitted from the differential antenna at the plurality of differential radiating gaps in the metallic sheet.

In some exemplary embodiments, the metallic sheet comprises a first arm and a second arm, the first and second arms being spaced apart on opposite facing sides of the longitudinal axis of the antenna, the differential radiating gaps being disposed between the first and second arms of the metallic sheet.

In some exemplary embodiments, the differential antenna further comprises a feeding structure connected to the metallic sheet, the feeding structure comprising a first conductor connected to the first arm of the metallic sheet and a second conductor connected to the second arm of the metallic sheet. The first conductor of the feeding structure can provide a 180-degree phase shift with respect to the second conductor of the feeding structure. The feeding structure can include a power splitter having first and second outputs, the first output being connected to the first conductor of the feeding structure and the second output being connected to the second conductor of the feeding structure. The feeding structure can include a phase shifter for providing a 180-degree phase shift with respect to the second conductor of the feeding structure. The phase shift provided by the phase shifter can be a 180-degree phase shift. The feeding structure can include a phase inverter for providing a 180-degree phase shift with respect to the second conductor of the feeding structure.

In some exemplary embodiments, the differential antenna further comprises a radome over the metallic sheet.

In some exemplary embodiments, the substrate is a printed circuit board (PCB). In some exemplary embodiments, the differential antenna further comprises at least one electronic component on a bottom surface of the substrate.

In some exemplary embodiments, the differential antenna further comprises at least one electronic component on a bottom surface of the substrate. In some exemplary embodiments, the at least one electronic component comprises a monolithic microwave integrated circuit (MMIC).

In some exemplary embodiments, the non-RF material comprises low-cost non-RF glass-reinforced epoxy laminate material.

In some exemplary embodiments, the differential antenna is a receive antenna structure.

In some exemplary embodiments, the differential antenna is a transmit antenna structure.

In some exemplary embodiments, the differential antenna further comprises at least one additional row of conductive vias formed in the substrate for isolating the differential antenna from other circuitry. In some exemplary embodiments, the additional row of conductive vias is disposed along a second via axis parallel to the first via axis.

In some exemplary embodiments, an electromagnetic field is formed and guided in the air gap between the metallic sheet and the pair of conductive microstrip lines and radiated through the differential radiating gaps in the metallic sheet.

In some exemplary embodiments, the plurality of support elements comprise a plurality of vertical support posts disposed along the longitudinal axis of the differential antenna.

In some exemplary embodiments, the plurality of support elements comprise a plurality of horizontal support bars disposed along the longitudinal axis of the differential antenna.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

According to some exemplary embodiments, an antenna structure for a radar sensor module, e.g., an automotive radar sensor, is provided in which the antenna structure does not require any costly high-frequency substrate material. As a result, the overall cost of the sensor is reduced. The antenna structure of the exemplary embodiments includes a low-cost laminate on which metallic structures are formed. For example, the conductive surface of the bottom plate of the waveguide as well as the ground plane of the feeding structure can be fully fabricated using standard techniques and low-cost materials.

According to some exemplary embodiments, two microstrip lines are formed parallel to each other and carry the differential-mode, i.e., second-order, radiation propagating in the air gap between the lines, i.e., bottom plate and the top suspended upper metallic sheet. This is the mode that is utilized for radiation and, therefore, the feed structure supports that mode. In order to accommodate this mode, a 180-degree phase difference is introduced between the two sections or "arms" of the upper metallic sheet carrying the fundamental mode radiation. A feed structure according to some exemplary embodiments utilizes power splitter and phase inverter sections as described below in more detail to convert fundamental-mode radiation into differential-mode, i.e., second-order-mode radiation.

Figure 1:
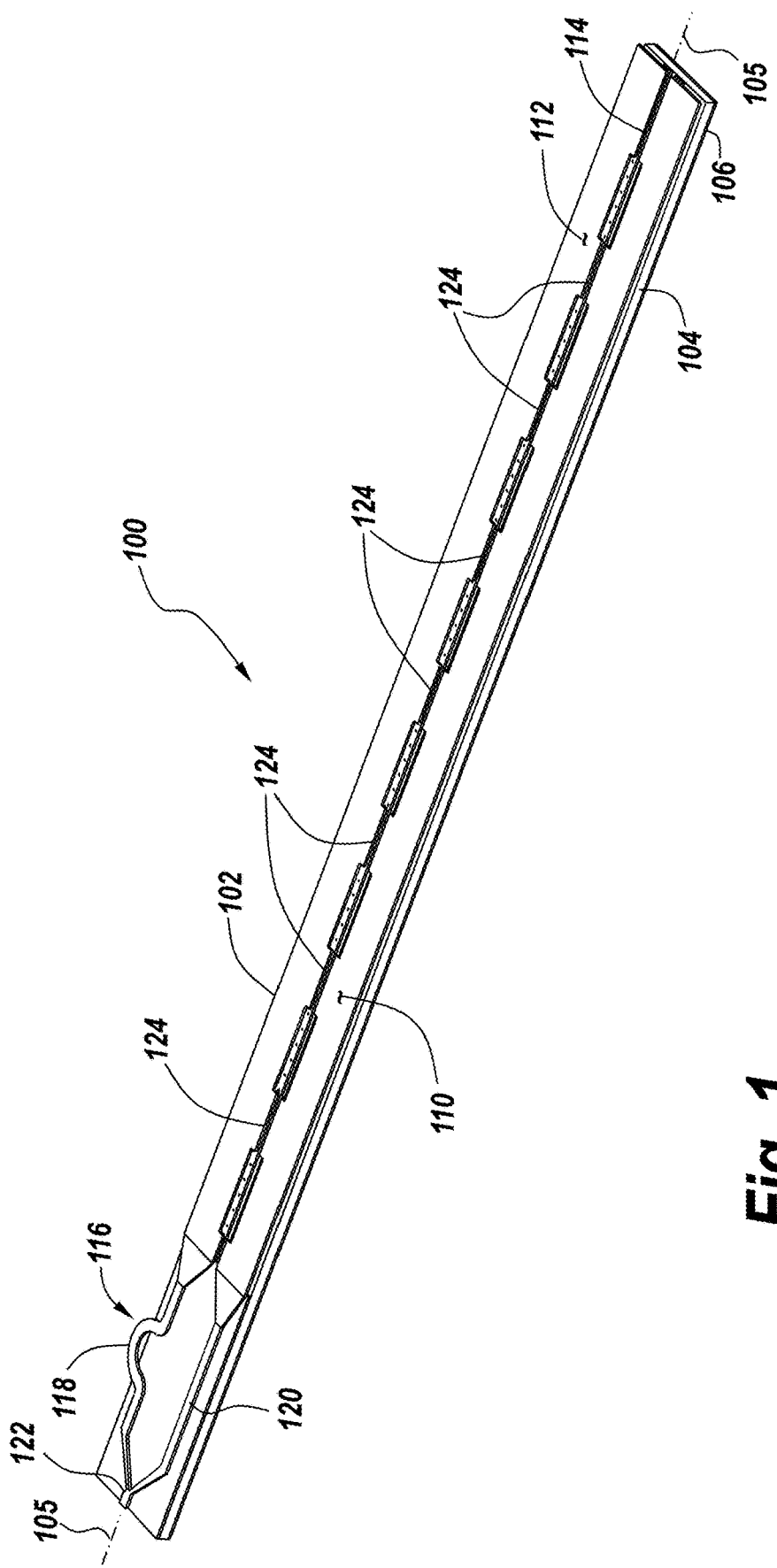
FIG. 1 includes a schematic top perspective view of a differential-mode antenna structure, according to some exemplary embodiments.
Figure 2:
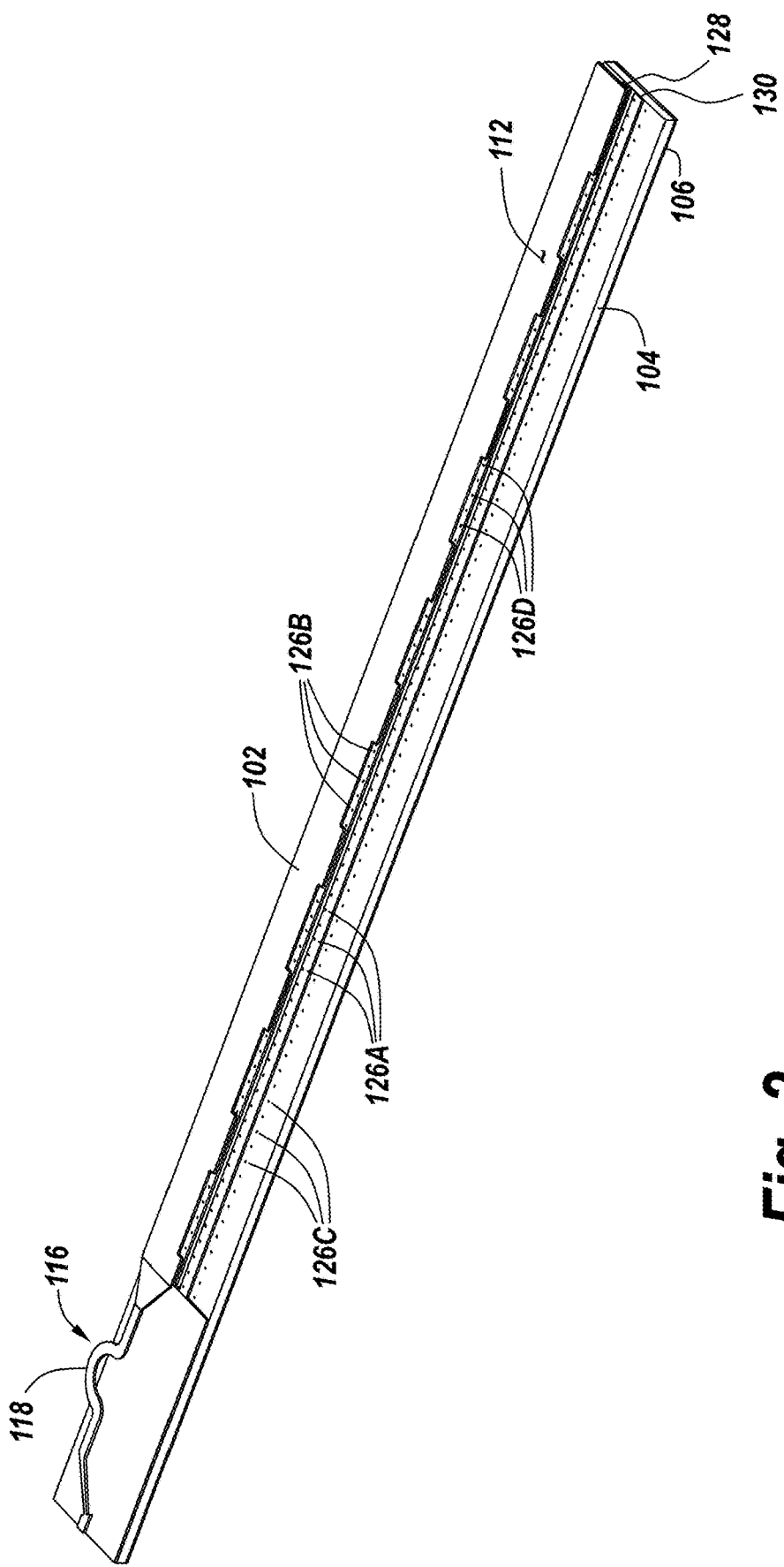
FIG. 2 includes a schematic top partially cut-away perspective view of the differential-mode antenna structure of FIG. 1, according to some exemplary embodiments.
Figure 3:
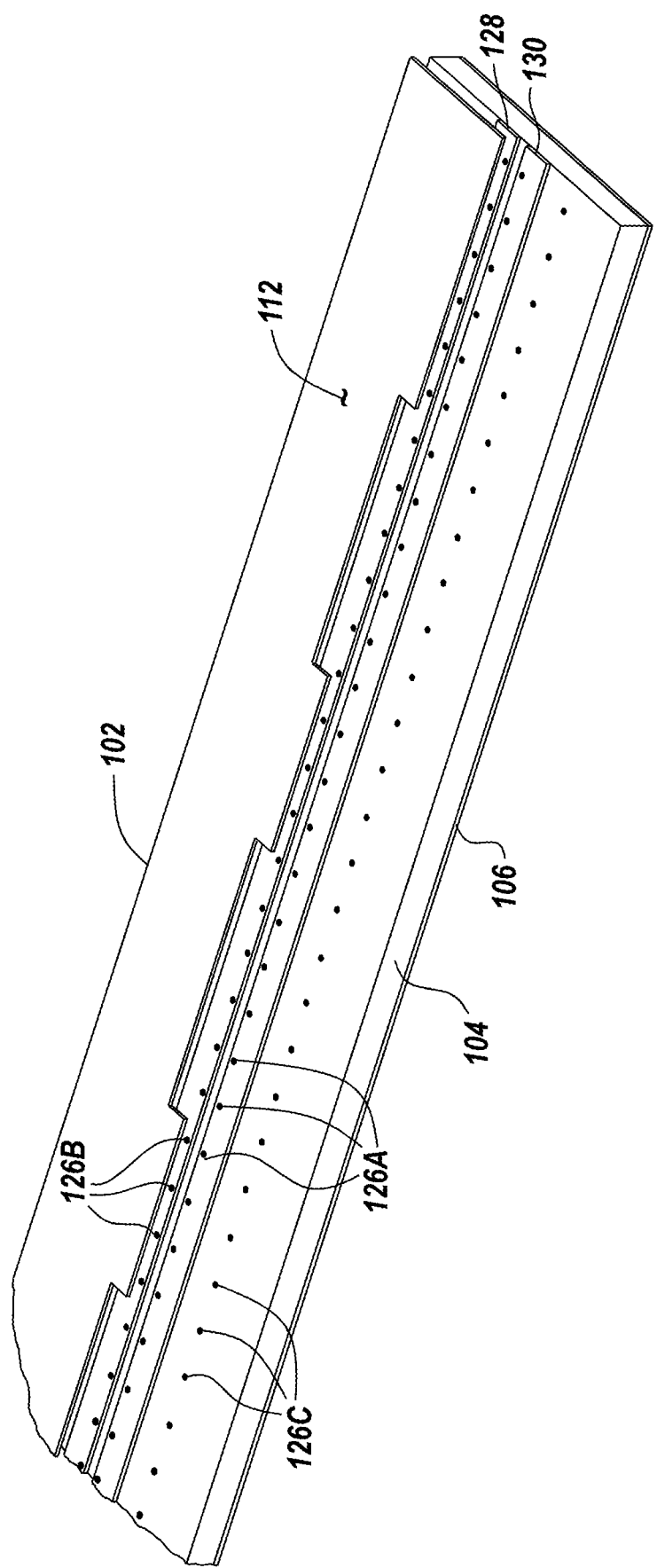
FIG. 3 includes a schematic top partially cut-away close-up perspective view of a portion of the differential-mode antenna structure of FIGS. 1 and 2, according to some exemplary embodiments.
Figure 4:
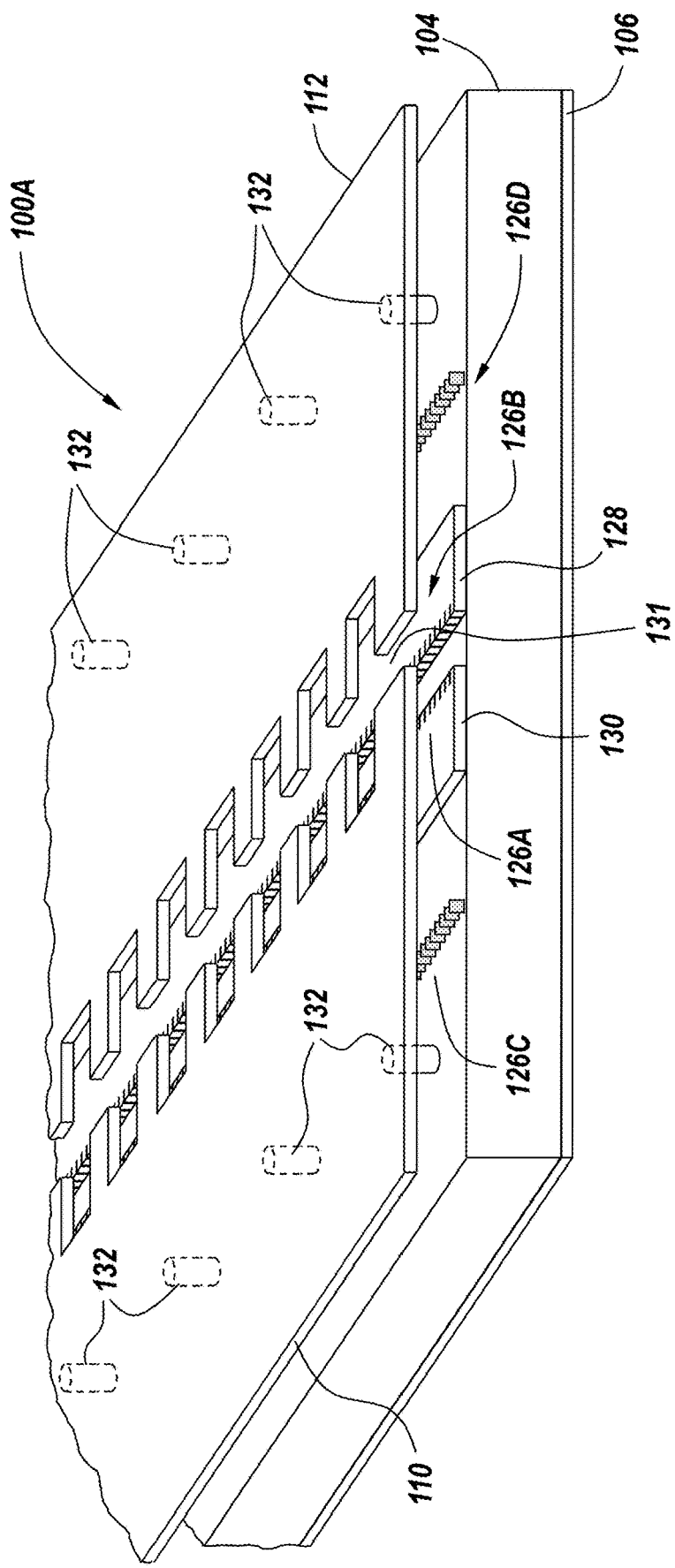
FIG. 4 includes a schematic top close-up perspective view of a portion of the differential-mode antenna structure of FIGS. 1 through 3, according to some particular exemplary embodiments.
Figure 5:
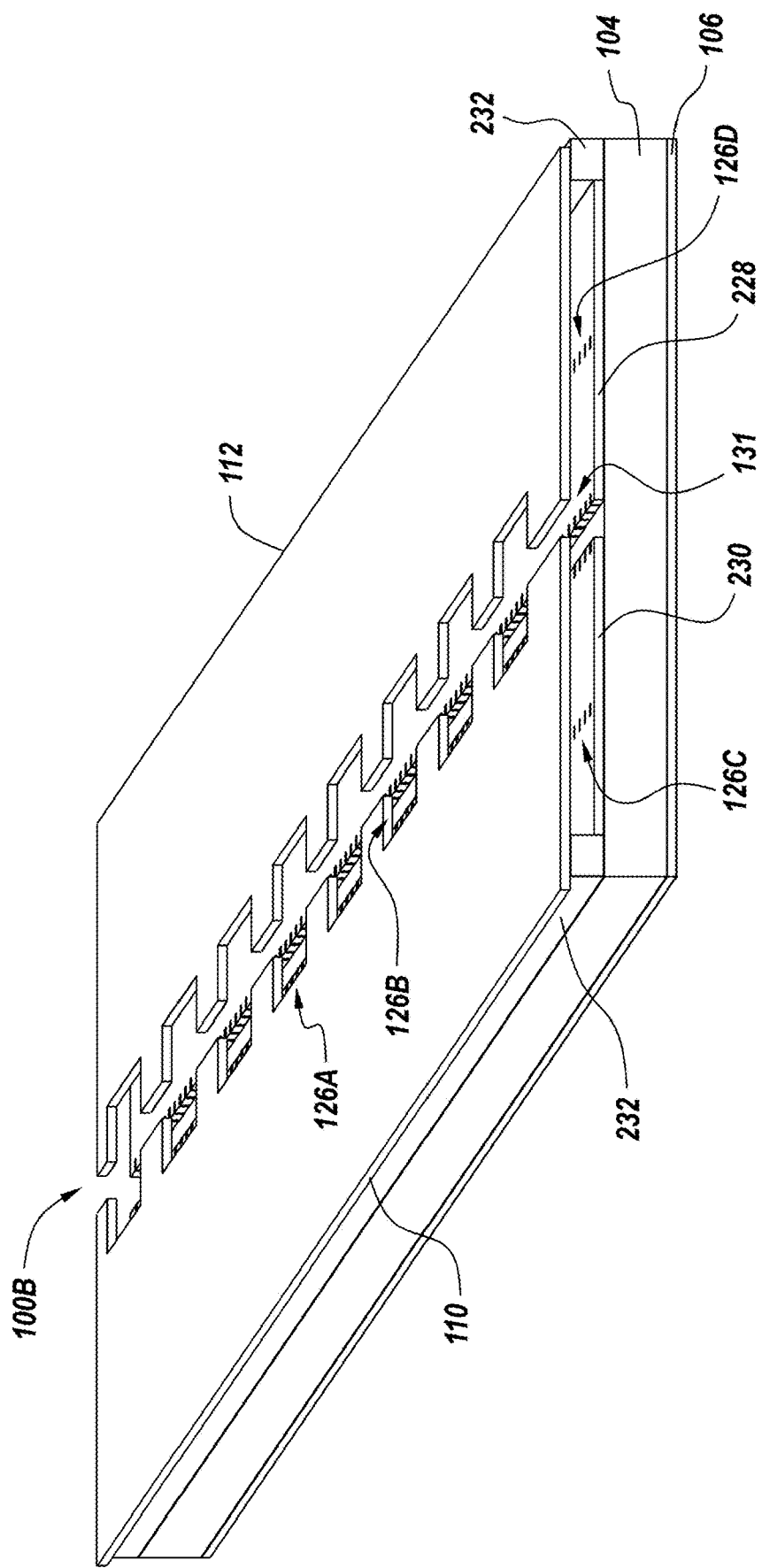
FIG. 5 includes a schematic top close-up perspective view of a portion of the differential-mode antenna structure of FIGS. 1 through 3, according to some other particular exemplary embodiments.

FIG. 1 includes a schematic top perspective view of a differential-mode antenna structure 100, according to some exemplary embodiments. FIG. 2 includes a schematic top partially cut-away perspective view of the differential-mode antenna structure 100 of FIG. 1, according to some exemplary embodiments. FIG. 3 includes a schematic top partially cut-away close-up perspective view of a portion of the differential-mode antenna structure 100 of FIGS. 1 and 2, according to some exemplary embodiments. FIGS. 2 and 3 illustrate antenna structure 100 with one arm or section 110 of upper metallic sheet 102 removed for clarity of illustration and ease of description. FIG. 4 includes a schematic top close-up perspective view of a portion of the differential-mode antenna structure 100 of FIGS. 1 through 3, according to some particular exemplary embodiments. FIG. 5 includes a schematic top close-up perspective view of a portion of the differential-mode antenna structure 100 of FIGS. 1 through 3, according to some other particular exemplary embodiments.

Referring to FIGS. 1-5, differential-mode antenna structure 100, 100A, 100B includes a substrate 104 made of relatively inexpensive substrate material, such as FR4 glass-reinforced epoxy laminate material. A lower metallic layer 106, made of a conductive metallic material such as copper or other similar material, is formed on the bottom surface of substrate 104. A pair of conductive lower microstrip lines 128, 130, are formed on the top surface of substrate 104. Microstrip lines 128, 130 are formed of a conductive metal, such as copper or other similar material, and serve as lower ground planes of air gap 131 in which radiation of antenna structure 100 propagates. Microstrip lines 128, 130 serve as the bottom plate of the waveguide in which radiation propagates, as well as the ground plane of the antenna feeding structure 116. They can be fabricated using standard techniques and low-cost materials.

An upper metallic sheet 102, made of a conductive metallic material such as copper or other similar material, is disposed over substrate 104 and microstrip lines 128, 130. Upper metallic sheet 102 can be formed such as by stamping to include a pair of sections or "arms" 110, 112 extending along a longitudinal axis 105 of antenna structure 100 and comprising differential radiating gaps 124 disposed between arms 110, 112 along longitudinal axis 105. In some exemplary embodiments, metallic sheet 102 is located and supported over substrate 104 and microstrip lines 128, 130 by a plurality of vertical support posts 132, which provide the appropriate mechanical support and spacing from microstrip lines 128, 130 to maintain a properly sized air gap 131 in which electromagnetic waves propagate and are radiated through radiating gaps 124 of differential antenna structure 100. The spacing in air gap 131 is determined by various design parameters for differential antenna structure 100. In some exemplary embodiments, air gap 131 is defined by a spacing between upper metallic sheet 102 and microstrip lines 128, 130 of between 100 µm and 1.5 mm, depending on the desired performance characteristics of antenna structure 100.

Continuing to refer to FIGS. 1-5, two rows of isolating and grounding vias 126A, 126B are placed through substrate 104 to confine transversely the propagating second-order mode. To avoid further leakage to the sides and reduce coupling between adjacent antenna structures in multi-antenna structures, additional, i.e., second and third, rows 126C, 126D of vias can be placed at some distance from the center of the waveguide, i.e., air gap 131, to form a transverse resonant cavity to block transverse leakage. All vias 126A, 126B, 126C, 126D can be fabricated using standard techniques on low-cost non-RF laminates. That is, isolating and grounding vias 126A, 126B, 126C, 126D can be drilled around the waveguide cavities, i.e., air gap 131, through substrate 104 and metallized according to any known metallization process.

Differential-mode antenna structure 100 includes a feeding structure 116, which provides the phase inversion between sections or arms 110, 112 of upper metallic sheet 102 needed to provide radiating gaps 124 with the second-order mode (differential) radiation. Feeding structure 116 receives the electromagnetic radiation and splits it into two feeding paths. The first path passes straight through feeding structure along a straight propagation path 120 to section or arm 110. The second path includes a phase inverter section 118, which introduces a nominal phase shift of 180 degrees, such that the second path of feeding structure 116 is phase-inverted with respect to the first path.

Differential-mode antenna structure 100A of FIG. 4 is the same as that illustrated and described above in connection with FIGS. 1-3. Differential-mode antenna structure 100B of FIG. 5 is different from the embodiments of FIGS. 1-4 in that, in antenna structure 100B of FIG. 5, instead of vertical support posts 132 supporting and providing the proper spacing between upper metallic sheet 102 and microstrip lines 128, 130, horizontal support bars 232 are used. Also, microstrip lines 228, 230 extend transversely across the entire antenna structure 100B, beyond the outer rows 126C, 126D of isolating vias, to support bars 232.

The structures of FIGS. 4 and 5 are different possible configurations for guiding the electromagnetic wave between the upper metallic sheet 102 and lower microstrip lines 128, 130 and 228, 230, and radiating it via controlled radiating gaps 124 on the upper metallic sheet 102 while reducing the leakage of the electromagnetic wave to the adjacent waveguiding channels. Truncated microstrip lines 128, 130 in FIG. 4 are accompanied by lines of vias 126C, 126D positioned at a certain predetermined distance from the lines to create a special cavity within the structure and limit propagation of the wave outwards from the central gap 131 and between the top and bottom planes, i.e., upper metallic sheet 102 and lower microstrip lines 128, 130 and 228, 230. As a result, most of the energy is confined at the desired location and will be radiated through radiating gaps 124. In the structures of FIGS. 4 and 5 support posts 132 and support bars 232, respectively, fully enclose the waveguiding area and suppress leakage between adjacent channels by creating a complete enclosure at both open ends of the planes. The desired isolation and support can be achieved by arrangement of such posts 132 to have certain dimensions and periodicity in their placement to achieve bandgap areas prevent the leakage. Also similar features can be built into the support bars 232 design (for the case seamless electrical contact via welding, conductive epoxy or screws is not possible or desired due to manufacturing preferences). Also, periodic posts or features on support bars 232 can be added to further control the coupling between the guiding channels in case mechanical limitations or fabrication tolerances prevent having a fully closed walls.

Figure 6:
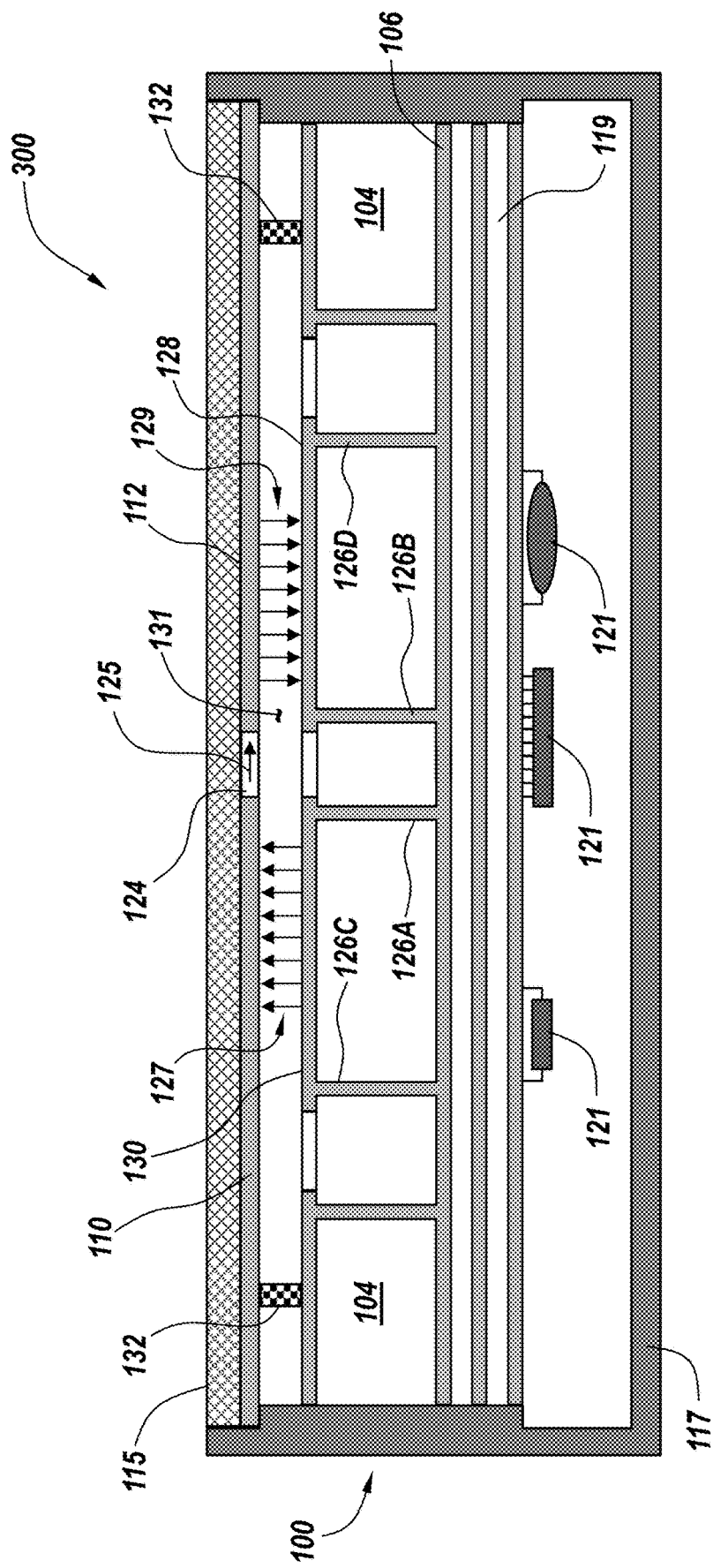
FIG. 6 includes a schematic cross-sectional view of an automotive radar sensor module which includes the integrated differential-mode antenna structure of the present disclosure, according to some exemplary embodiments.

FIG. 6 includes a schematic cross-sectional view of an automotive radar sensor module 300 which includes integrated differential-mode antenna structure 100 of the present disclosure, according to some exemplary embodiments. Referring to FIG. 6, radar sensor module 300 includes the elements of differential-mode antenna structure 100 described above in connection with FIGS. 1-5. Like elements among the various embodiments are identified herein by like reference numerals. Referring to FIG. 6, radar sensor module 300 includes at least one printed circuit board (PCB) 119, on the lower surface of which various electronic components 121, including integrated circuits and passive elements, can be mounted. PCB 119 and differential-mode antenna structure 100 are mounted and enclosed within a radar sensor housing 117, which is covered by a radome 115 which serves to protect the interior of sensor 300 from the environment and can be formed of low-cost non-RF material such as FR4.

Continuing to refer to FIG. 6, substrate 104 includes lower metallic layer 106. Vias 126A, 126B, 126C, 126D pass through substrate 104 between microstrip lines 128, 130 and lower metallic layer 106. Support posts 132 provide the mechanical support and appropriate spacing of sections or arms 110, 112 of upper metallic sheet 102 over microstrip lines 128, 130 to create air gap 131 in which radiation propagates. Electric field (E field) vectors 127 illustrate E-field distribution in air gap 131 above microstrip line 130, and E-field vectors 129 illustrate E-field distribution in air gap 131 above microstrip line 128. Thus, as illustrated by E-field vectors 127 and 129, a differential E-field distribution is created in air gap 131 under the radiating plates, that is, sections or arms 110, 112 of upper metallic sheet 102. This results in generating a radiating E-field in radiating gaps 124 as illustrated by radiating E-field vector 125.

Figure 7:
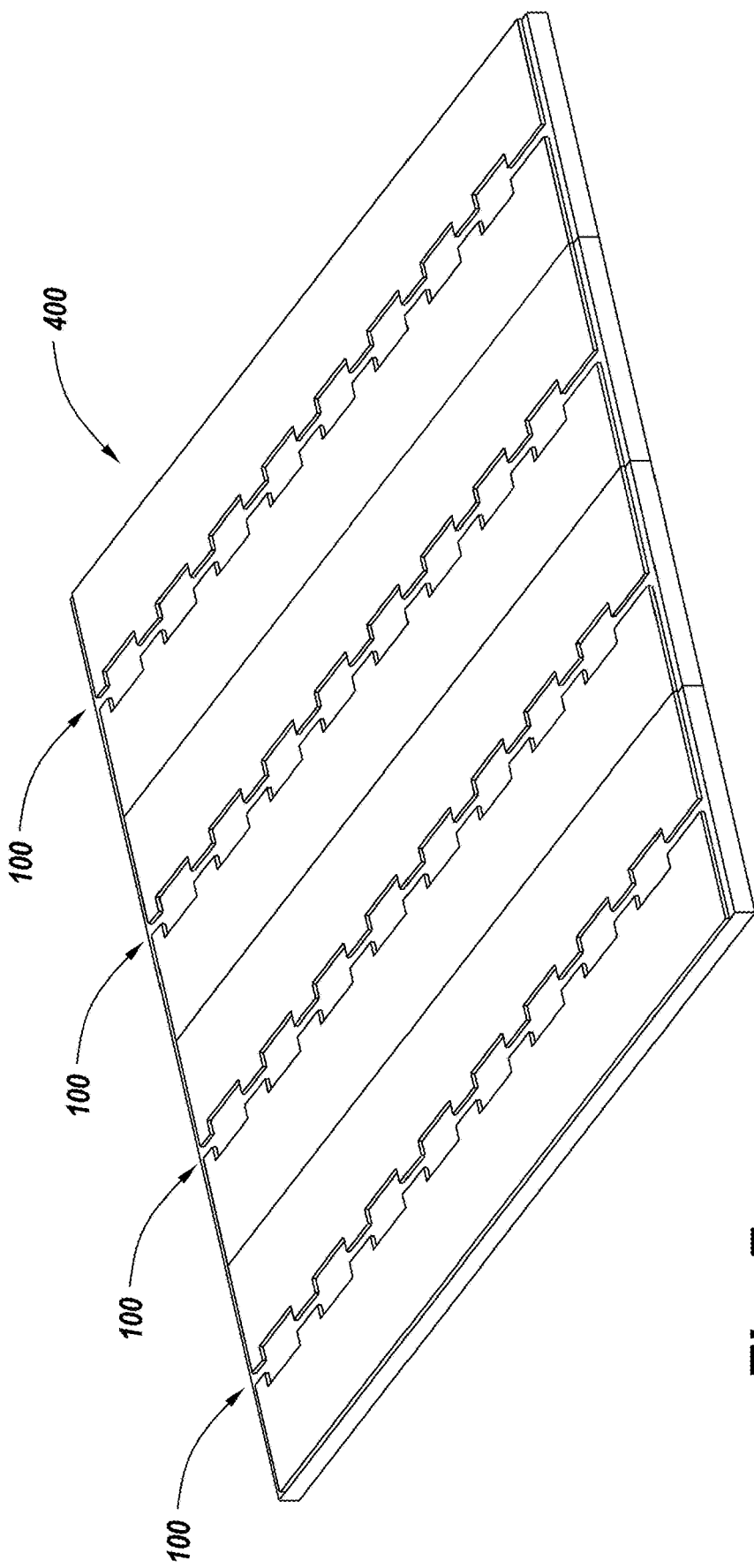
FIG. 7 includes a schematic top perspective view of multi-element antenna configuration including multiple integrated differential-mode antenna structures of the present disclosure, in, for example, a multi-channel radar system, according to some exemplary embodiments.

FIG. 7 includes a schematic top perspective view of a multi-element antenna configuration including multiple integrated differential-mode antenna structures 100 of the present disclosure, in, for example, a multi-channel radar system 400, according to some exemplary embodiments. Individual antenna structures 100 can be transversely spaced by one-half wavelength. For the vertically arranged antenna structures described and illustrated herein, the polarization is horizontal. In alternative embodiments, the antenna structure can be a slotted line structure.

Several advantages are realized by the structure and techniques of the present disclosure. For example, using an air-filled waveguide for antennas and feeder lines results in low loss, low dispersion, higher bandwidth, and generally high performance in guiding and radiating the electromagnetic waves propagating through them. Also, relatively non-complex standard manufacturing processes using relatively inexpensive materials, such as commonly used FR4, results in significant reduction in overall cost of the radar sensor, while maintaining or improving sensor performance.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A differential antenna, comprising:
    a substrate formed of a laminate material;
    a pair of conductive microstrip lines formed on a top surface of the substrate, the microstrip lines extending along a longitudinal axis of the differential antenna and being spaced apart to define a gap between the pair of conductive microstrip lines extending along the longitudinal axis of the antenna;
    a plurality of support elements formed over the top surface of the substrate;
    a metallic sheet formed over the pair of conductive microstrip lines and supported by and vertically spaced apart from the pair of metallic strip lines by the plurality of support elements to form an aft gap between the metallic sheet and the pair of conductive microstrip lines, the metallic sheet being patterned to include a plurality of differential radiating gaps disposed along the longitudinal axis of the antenna and above the gap between the pair of conductive microstrip lines; and
    at least four rows of metallic vias formed in the substrate; each row of metallic vias being disposed along a first via axis parallel to the longitudinal axis of the antenna, the four rows of metallic vias being disposed and spaced apart laterally with respect to the gap between the pair of conductive microstrip lines to define two propagation air cavities in which radiation can propagate between pairs of rows of vias and between the metallic sheet and the pair of conductive microstrip lines; wherein
    the differential antenna is configured such that the radiation is a differential-mode type of radiation, which is emitted from the differential antenna at the plurality of differential radiating gaps in the metallic sheet.

2. The differential antenna of claim 1, wherein the metallic sheet comprises a first arm and a second arm, the first and second arms being spaced apart on opposite facing sides of the longitudinal axis of the antenna, the differential radiating gaps being disposed between the first and second arms of the metallic sheet.

3. The differential antenna of claim 1, further comprising a feeding structure connected to the metallic sheet, the feeding structure comprising a first conductor connected to the first arm of the metallic sheet and a second conductor connected to the second arm of the metallic sheet.

4. The differential antenna of claim 3, wherein the first conductor of the feeding structure provides a 180-degree phase shift with respect to the second conductor of the feeding structure.

5. The differential antenna of claim 3, wherein the feeding structure comprises a power splitter having first and second outputs, the first output being connected to the first conductor of the feeding structure and the second output being connected to the second conductor of the feeding structure.

6. The differential antenna of claim 3, wherein the feeding structure comprises a phase shifter for providing a 180-degree phase shift with respect to the second conductor of the feeding structure.

7. The differential antenna of claim 6, wherein the phase shift provided by the phase shifter is a 180-degree phase shift.

8. The differential antenna of claim 3, wherein the feeding structure comprises a phase inverter for providing a 180-degree phase shift with respect to the second conductor of the feeding structure.

9. The differential antenna of claim 1, further comprising a radome over the metallic sheet.

10. The differential antenna of claim 1, wherein the substrate is a printed circuit board (PCB).

11. The differential antenna of claim 10, further comprising at least one electronic component on a bottom surface of the substrate.

12. The differential antenna of claim 1, further comprising at least one electronic component on a bottom surface of the substrate.

13. The differential antenna of claim 12, wherein the at least one electronic component comprises a monolithic microwave integrated circuit (MMIC).

14. The differential antenna of claim 1, wherein the laminate material comprises a glass-reinforced epoxy laminate material.

15. The differential antenna of claim 1, wherein the differential antenna is a receive antenna structure.

16. The differential antenna of claim 1, wherein the differential antenna is a transmit antenna structure.

17. The differential antenna of claim 1, further comprising at least one additional row of conductive vias formed in the substrate for isolating the differential antenna from other circuitry.

18. The differential antenna of claim 17, wherein the additional row of conductive vias is disposed along a second via axis parallel to the first via axis.

19. The differential antenna of claim 1, wherein an electromagnetic field is formed and guided in the air gap between the metallic sheet and the pair of conductive microstrip lines and radiated through the differential radiating gaps in the metallic sheet.

20. The differential antenna of claim 1, wherein the plurality of support elements comprise a plurality of vertical support posts disposed along the longitudinal axis of the differential antenna.

21. The differential antenna of claim 1, wherein the plurality of support elements comprise a plurality of horizontal support bars disposed along the longitudinal axis of the differential antenna.

* * * * *